Patented Oct. 20, 1953

2,656,390

UNITED STATES PATENT OFFICE 2,656,390

PROCESSES FOR THE PREPARATION OF CYCLOPOLYMETHYLENIC KETONES

Max Stoll, Geneva, Switzerland, assignor to Firmenich & Co., successeurs de la Societe Anonyme M. Naef & Cie., Geneva, Switzerland, a corporation of Switzerland No Drawing. Application September 27, 1948, Serial No. 51,481. In Switzerland October 7, 1947

9 Claims. (Cl. 260—586)

The present invention relates to a process for the preparation of cyclopolymethylenic ketones, alkylated or not, having from 10 to 18 members in the ring, whose formula is

wherein R represents a chain of from 9 to 17 groups —$CH_2$—, one or several of which can be alkylated, for instance methylated.

This process consists in subjecting to a partial reduction a 1,2-cyclopolymethylenic ketol, alkylated or not and having in its ring the same number of members as that of the desired ketone.

The invention is based on the unexpected fact that in the 1,2-cyclanolones (Formula II) having from 10 to 18 members in the ring (in the Formulae I, II, and III $x=8$ to 16) the hydroxyl group can, for the most part, be reduced to a —$CH_2$— group before the ketone group itself is reduced to a —$CH_2$— group, which allows a direct reduction of the 1,2-cyclanolones to cyclanones (Formula III). This partial reduction, which is the characteristic of the process of the invention, and which may be carried out according to known methods, has the advantage of being applicable not only to pure 1,2-cyclanolones as those obtained according to the process described in the U. S. patent application No. 714,650 of December 6, 1946, now U. S. Patent No. 2,529,825, but also to impure 1,2-cyclanolones, such as those obtained according to the process of the U. S. Patent No. 2,228,268 which also contain isomeric products or cyclopolymethylenic-1,2-diketones (Formula I). These diketones are first reduced to cyclanolones, so that the cyclanolones containing such diketones give yields of polymethylenic ketones which reach 50 to 60% of the yields obtained with pure cyclanolones.

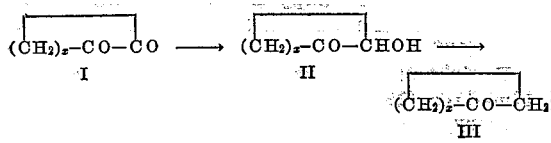

The reduction of the cyclanolones into cyclanones being a partial reduction, it is of course necessary to maintain the conditions of reduction within such limits that the difference of reductibility of the two functional groups (which reaches its maximum in the decane ring) be turned, as far as possible, to the best account. The best plan is to adjust the reduction so as to have it produce but a small quantity of cyclane besides the cyclanone. This adjustment is to be obtained either through an adjustment in the temperature, or through an adjustment in the concentration of the hydrochloric acid used jointly with zinc, or yet in the choice of the solvents in which the reduction is carried out, or of the dilution of the reagents of the catalysts (salts of lead) used, etc.

Inasmuch as the cyclanolones (Formula II), or their admixtion with cyclanediones (Formula I), have become easily accessible, their reduction represents an important industrial progress for the preparation of cyclopolymethylenic ketones.

A few concrete examples are given below to illustrate the process. But they do not exhaust the methods of reduction nor the working conditions which can be used, as the adjustment of the reduction mentioned above is manifold. Yields vary, according to the method of reduction utilised and the size of the ring, between 50 and 90% of the theoretic yields.

Example 1

10 gr. of crude cyclohexadecanol-(1)-one-(2), obtained according to the process described under American patent application No. 714,650, now U. S. Patent No. 2,529,825, are distilled slowly and in good vacuo. The vapours are conducted through a tube filled with purified asbestos carrying 40 gr. of zinc dust heated to 345–355° C. The velocity of the distillation is such that in one hour and a half 7 gr. of product are distilled. The distillate, partly crystallised, yields 5.5 gr. of semi-carbazone of the M. P. 178–180°. The yield in cyclohexadecanone is roughly 47% of the theoretic yield.

Example 2

4 gr. of cyclohexadecanolone-1,2, purified by distillation, are dissolved in 80 $cm.^3$ of crude ethyl-alcohol. After adding thereto 30 gr. of zinc dust, the solution is heated to boiling point and a rapid gaseous hydrochloric acid current is introduced therein (about 1 gr. HCl per 15′) until the zinc is almost entirely consumed, which requires roughly 8 hours. After dilution with water and extraction with ether, etc., 3.85 gr. of neutral parts are obtained, 3.15 gr. of which distil under a pressure of 0.05 mm. between (110)–120–125° (130°) and yield 3.1 gr. of semicarbazone melting at 181–182°. The yield in cyclohexadecanone is 62% of the theoretic yield.

Example 3

10.8 gr. of cyclodecanolone-1,2, distilled once, are dissolved in 25 grammes of acetic acid and poured on 25 grammes of zinc wool. After adding 25 grammes of concentrated hydrochloric acid, the whole is heated on an oil bath at 100°. 25 grammes of concentrated hydrochloric acid are added every half hour. 100 grammes of that acid are used altogether. After the usual treatment, the reaction product is treated with a solution of semicarbazide hydrochloride. After recrystallization, 9.5 gr. of semicarbazone of the cyclodecanone are obtained (71% of the theoretic yield) melting at 203–205°. 3.712 mgr. of substance yielded 8.464 mgr. $CO_2$ and 3.304 mgr. $H_2O$.

$C_{11}H_{21}ON_3$:
  Calculated_____ C, 62.52; H, 10.02%.
  Found_____C, 62.37; H, 9.96%.

A mechanical stirring is favourable to that kind of reduction. The yield may then reach 90% of the theoretic yield, especially if the solution of the initial product is dropped slowly in the acetic acid.

*Example 4*

8 gr. of cyclopentadecanolone-1,2, distilled once, are dissolved in 160 cm.$^3$ of dioxane. 40 gr. of zinc wool are added to the solution and the latter is heated to boiling point introducing therein a gaseous hydrochloric acid current at a velocity of 15 gr. per hour. As the zinc dissolves, the velocity of the gaseous current is lessened up to 3 gr. per hour. The reduction lasts from 2½ hours to 3 hours. The dioxane and the zinc are eliminated, then the reaction product dissolved in ether is washed with sodium carbonate and water. Roughly 16 gr. of zinc are recovered. The product is distilled under 0.04 mm. of pressure and a fraction of 6.55 gr. is obtained which distils between 111° and 153° C. This fraction is treated in the cold with light petroleum ether and thus 0.26 gr. of insoluble products are eliminated. The soluble product is converted into semicarbazone. 6.5 gr. are obtained therefrom, melting at 182–183°. If the latter is mixed with semicarbazone of exaltone melting at 187°, the M. P. of the latter does not undergo any depression.

Yield.—70% of the theoretic yield. 0.7 gr. of product does not yield any semicarbazone.

*Example 5*

10 gr. of cyclopentadecanol-2-one-1, distilled once, are dissolved in 30 cm.$^3$ of ethyl-alcohol. To this mixture are added in the cold 10 cm.$^3$ of concentrated aqueous hydrochloric acid (40%) and 2 gr. of zinc-filings. The whole is heated to boiling point. When the zinc is almost consumed, 2 gr. of fresh zinc and 5 cm.$^3$ of hydrochloric acid are again added, so that the concentration of the acid never exceeds 8%. After adding thus 22 gr. of zinc (17.1 gr. of which are consumed) and 55 cm.$^3$ of hydrochloric acid, the reaction product is extracted with ether. 9.68 gr. of neutral parts are obtained, 7.71 of which distil under 0.07 mm. between 117–170° C. (6.43 gr. between 117–127° C.) yielding 7.73 gr. of semicarbazone of the M. P. 182–185° C. The yield in cyclopentadecanone (exaltone) is 66% of the theoretic yield.

If the reductions described under Examples 3 to 5 cyclanolone is used in larger dilution, the quantity of the residues lessens and the yields increase. The purity of the reagents also influences the yields; traces of iron and mercury are of disadvantage to the reduction, but traces of lead are favorable to it.

What I claim is:

1. A process for the preparation of cyclopolymethylenic ketones, having ten to 18 carbon atoms in the ring, consisting in reducing the hydroxy group of a 1-2 cyclopolymethylenic ketol, having in the ring the same number of carbon atoms as that of the desired ketone, to a $CH_2$ group by reducing the same with a reduction agent comprising metallic zinc in such manner that only minor quantities of the keto group contained in the molecule are reduced.

2. A process as defined in claim 1 wherein the starting material 1-2 cyclopolymethylenic ketol contains at least one alkyl group as a substituent in the ring.

3. A process according to claim 1, consisting in using as starting material 1,2-cyclopolymethylenic ketols in their crude state.

4. A process according to claim 1, wherein the starting material is 1,2-cyclopolymethylenic ketols containing 1,2-cyclopolymethylenic diketones as impurity.

5. A process according to claim 1, consisting in effecting the partial reduction with metallic zinc and hydrochloric acid.

6. A process according to claim 1, consisting in effecting the partial reduction with metallic zinc and aqueous hydrochloric acid in a liquid medium containing an organic solvent.

7. A process according to claim 1, consisting in effecting the partial reduction with metallic zinc and gaseous hydrochloric acid in an organic solvent.

8. A process according to claim 1, consisting in effecting the partial reduction by passing vapours of ketol over zinc dust heated between 300 and 360° C. and in a high vacuum.

9. A process according to claim 1, consisting in effecting the partial reduction with the help of zinc and hydrochloric acid the concentration of which is kept, during the reduction, to approximately 8% of the reaction mixture.

MAX STOLL.

References Cited in the file of this patent

UNITED STATES PATENTS

| Number | Name | Date |
|---|---|---|
| 1,702,852 | Ruzicka | Feb. 19, 1929 |
| 2,228,268 | Hansley | Jan. 14, 1941 |

OTHER REFERENCES

Wallach: Annalen, vol. 414, pages 367–371 (1917).

Ruzicka et al.: Helv. Chim. Acta., vol. 11, pages 496–512, (1928). Copy in Dept. of Agriculture Library, Chemical Abstracts, vol. 22, Col. 2928 (1928).

Ruzicka et al.: Helv. Chim. Acta., vol. 11, pages 670–686 (1928). Copy in Dept of Agriculture Library, Chemical Abstracts, vol. 22, Cols. 4482–4483 (1928).

Ruzicka et al.: Helv. Chim. Acta., vol. 13, pages 1152–1185 (1930). Copy in Dept. of Agriculture Library, Chemical Abstracts, vol. 25, Col. 922 (1931).

Burton et al.: J. Chem. Soc., 1939, pages 567–573.

Taylor: "Richter's Organic Chemistry," vol. 11, pages 77 to 80 and 107 to 109, third edition, 1939. Nordeman Publishing Co., New York.

Ruzicka et al.: Helv. Chim. Acta., vol. 25, pages 604–620 (1942).

Shoppee: J. Chem. Soc., 1928, pages 1662–70.